(12) United States Patent
Schober

(10) Patent No.: US 6,743,327 B2
(45) Date of Patent: Jun. 1, 2004

(54) SOLID SURFACE PRODUCTS

(75) Inventor: Dennis A. Schober, Newcastle, WA (US)

(73) Assignee: Schober, Inc., Renton, WA (US)

( * ) Notice: Subject to any disclaimer, the term of this patent is extended or adjusted under 35 U.S.C. 154(b) by 0 days.

(21) Appl. No.: 10/106,833

(22) Filed: Mar. 25, 2002

(65) Prior Publication Data

US 2003/0113485 A1 Jun. 19, 2003

Related U.S. Application Data

(60) Provisional application No. 60/307,898, filed on Jul. 25, 2001.

(51) Int. Cl.[7] .............................................. B32B 31/20
(52) U.S. Cl. ................. 156/309.6; 156/228; 156/308.2; 156/312
(58) Field of Search .......................... 156/87, 228, 276, 156/308.2, 309.6, 311, 312, 103, 104, 583.1; 264/294; 428/46, 47, 50, 77, 78, 79

(56) References Cited

U.S. PATENT DOCUMENTS

| | | | |
|---|---|---|---|
| 2,470,509 A | * | 5/1949 | Marini .................... 156/102 |
| 3,488,246 A | | 1/1970 | Duggins |
| RE27,093 E | | 3/1971 | Slocum |
| 3,616,021 A | | 10/1971 | Valerius |
| 3,642,975 A | | 2/1972 | Duggins et al. |
| 3,847,865 A | | 11/1974 | Duggins |
| 4,107,135 A | | 8/1978 | Duggins et al. |
| 4,445,951 A | * | 5/1984 | Lind et al. .................... 156/93 |
| 5,286,290 A | | 2/1994 | Risley |
| 5,591,530 A | | 1/1997 | Warner et al. |
| 5,837,091 A | * | 11/1998 | Theil et al. .............. 156/308.2 |
| 5,916,515 A | * | 6/1999 | Bryan et al. ............... 29/623.3 |
| 5,958,539 A | | 9/1999 | Eckart et al. |
| 5,998,028 A | | 12/1999 | Eckart et al. |
| 6,025,069 A | | 2/2000 | Eckart et al. |
| 6,224,706 B1 | | 5/2001 | Matich |

\* cited by examiner

Primary Examiner—Jeff H. Aftergut
Assistant Examiner—John L. Goff
(74) Attorney, Agent, or Firm—Black Lowe & Graham PLLC

(57) ABSTRACT

A flat non-porous unitary solid surface product comprised of: (a) a flat non-porous unitary matrix made of polymethylmethacrylate, polyvinyl chloride, polycarbonate, or combinations thereof; and (b) a visible decorative object that is permanently fixated in the matrix, wherein the decorative object extends to least one edge of the matrix. A method for manufacturing the flat non-porous unitary solid surface product.

20 Claims, 2 Drawing Sheets

SOLID SURFACE PRODUCTS

CROSS-REFERENCE TO RELATED APPLICATION

This application claims the benefit of U.S. Provisional Application No. 60/307,898 filed Jul. 25, 2001.

FIELD OF THE INVENTION

The present invention relates to flat non-porous unitary solid surface structures, and more particularly, to flat non-porous unitary solid surface products comprised of: (1) a matrix made of polymethylmethacrylate, polyvinyl chloride, polycarbonate, or combinations thereof; and (2) one or more visible decorative objects that are permanently fixated in the matrix, and methods for manufacturing these products. These manufacturing methods do not involve using a mold or casting a liquid resin around the decorative object to be fixated. The solid surface products of the invention provide strikingly beautiful and unusual visual effects that are difficult to describe in words.

BACKGROUND OF THE INVENTION

Solid surface products made of cured polymethylmethacrylate containing fine microscopic particles of inert inorganic fillers are known in the art. It is believed that all of the prior art polymethylmethacrylate solid surface products are made by using a mold and by casting therein a liquid acrylic resin which is then cured to form polymethylmethacrylate. For example, E. I. DuPont de Nemours and Company originated the solid surface category of products more than thirty years ago when it introduced the synthetic product sold under the trademark CORIAN which is believed to be a polymethylmethacrylate matrix containing large amounts of microscopic particles of inert inorganic fillers. It is believed that CORIAN is made by casting a liquid acrylic resin in a mold of some type and then curing the resin to form polymethylmethacrylate. CORIAN is usually an opaque product which mimics the decorative effect of marble. CORIAN is useful for kitchen countertops, kitchen sinks, bathroom lavatories, desktops, windowsills, and the like. Several patents owned by DuPont describe casting plastic simulated marble building products which are believed to be CORIAN. See Slocum U.S. Reissue Pat. No. Re 27,093, Duggins U.S. Pat. No. 3,488,246, Duggins et al. U.S. Pat. No. 3,642,975, Duggins U.S. Pat. No. 3,847,865, and Duggins et al. U.S. Pat. No. 4,107,135. In general terms, these DuPont patents describe cast products which are made of cured polymethylmethacrylate containing 30% to 80% by weight of microscopic particles (for example, particles having an average size of 7 microns) of inert inorganic fillers such as calcium carbonate, calcium sulfate, clay, silica, glass, calcium silicate, alumina, carbon black, titania, powdered metals, and alumina trihydrate.

Other synthetic solid surface products are sold by Avonite, Inc. under the trademark AVONITE which mimic the decorative effect of artificial stone. Risley U.S. Pat. No. 5,286,290 assigned to Avonite, Inc. describes dehydrating alumina trihydrate, rehydrating with a solution of dye, drying the solution to make colored alumina trihydrate, adding the colored alumina trihydrate to a resin matrix containing inert fillers, and cast to make a fire retardant solid decorative material having the appearance of artificial granite. The resin matrix may be ortho or iso polyesters, acrylics, or polycarbonates. The product may be in the form of a sheet or slab for kitchen countertops and decorative architectural surfaces or facades.

Eckart et al. U.S. Pat. No. 5,958,539 assigned to Eastman Chemical Company discloses a thermoplastic article having a fabric comprised of textile fibers embedded therein produced by applying heat and pressure to a laminate comprising, in order, (1) an upper sheet material, (2) a fabric comprised of textile fibers, and (3) a lower sheet material to produce a thermoplastic article having the fabric embedded therein. The upper and lower sheet materials are specifically made of a PETG copolyester available from Eastman Chemical Company. PETG is the acronym for polyethylene terephthalate glycol.

A similar patent is Eckart et al. U.S. Pat. No. 5,998,028 assigned to Eastman Chemical Company which discloses a thermoplastic article having metallic wire, rod, and/or bar embedded therein produced by applying heat and pressure to a laminate comprising, in order, (1) an upper sheet material, (2) metallic wire, rods, or bars, and (3) a lower sheet material to produce a thermoplastic article having the metallic wire, rod, and/or bar embedded therein. As in Eckart et al. U.S. Pat. No. 5,958,539 above, the upper and lower sheet materials are specifically made of a PETG copolyester available from Eastman Chemical Company.

Another similar patent is Eckart et al. U.S. Pat. No. 6,025,069 assigned to Eastman Chemical Company which discloses a thermoplastic article having a high-relief, molded or embossed surface produced by contacting a laminate comprising a first or outer copolyester sheet material and a second or backing copolyester sheet material with heat and pressure using a heated element which simultaneously causes the material to be bonded and a high-relief, decorative appearance to be produced on at least one surface of the thermoplastic article. Also disclosed is an embossed or molded, bonded laminate comprising, in order, (1) a first or outer copolyester layer, (2) a second layer comprising a film which is colored or which bears an image or pattern, and (3) a third or backing copolyester layer, wherein the first and third layers are composed on the copolyester. As in Eckart et al. U.S. Pat. No. 5,958,539 and Eckart et al. U.S. Pat. No. 5,998,028 above, the copolyester layers are specifically made of a PETG copolyester available from Eastman Chemical Company.

Prior to the present invention, there existed a long-felt need for a dry process for making a unitary solid surface product comprised of: (1) a matrix made of polymethylmethacrylate, polyvinyl chloride, polycarbonate, or combinations thereof; and (2) one or more visible decorative objects (objects that are visible to the unaided human eye) that are permanently fixated in the matrix. It was believed by knowledgeable people in the plastics industry that it was not possible to make such a solid surface product without using a mold and casting therein a liquid resin around the object to be fixated. It is believed that researchers who attempted to make such products using a dry process (that is, without using a mold and casting a liquid resin around the object to be fixated) produced products which contained defects such as air bubbles entrapped in the matrix, voids in the matrix, or cracks in the matrix.

Extensive research finally led to the present invention which allows an object to be fixated in a unitary matrix made of polymethylmethacrylate, polyvinyl chloride, polycarbonate, or combinations thereof, without using a mold and casting therein a liquid resin around the object. In addition, the present invention provides aesthetically-pleasing products which are free of defects of the type referred to above.

SUMMARY OF THE INVENTION

In one embodiment the invention is a flat non-porous unitary solid surface structure comprised of: (a) a flat non-porous unitary thermoplastic polymeric matrix made of polymethylmethacrylate, polyvinyl chloride, polycarbonate, or combinations thereof; and (b) a visible decorative object that is permanently fixated in the matrix, wherein the decorative object extends to least one edge of the matrix.

In another aspect the invention is a method for manufacturing the flat non-porous unitary solid surface structure including the steps of: (a) providing a first flat non-porous unitary thermoplastic polymeric sheet made of polymethylmethacrylate, polyvinyl chloride, or polycarbonate; (b) placing a decorative object on the first sheet of polymeric material wherein the decorative object extends beyond at least one edge of the first sheet of polymeric material; (c) placing a second flat non-porous unitary thermoplastic polymeric sheet of made of polymethylmethacrylate, polyvinyl chloride, or polycarbonate on top of the decorative object wherein the decorative object also extends beyond at least the corresponding edge of the second sheet of polymeric material, whereby a lay-up sandwich is formed comprised of the first flat sheet of polymeric material, the decorative object which extends beyond at least one edge of both of the sheets of polymeric material, and the second flat sheet of polymeric material; (d) loading the lay-up sandwich into a press; (e) applying a predetermined amount of heat and pressure to the lay-up sandwich for a predetermined period of time; (f) opening the press to allow air and gases to escape from the lay-up sandwich; (g) closing the press and applying a predetermined amount of heat and pressure to the lay-up sandwich for a predetermined period of time whereby the first and second polymeric material sheets melt together in the lay-up sandwich to provide a unitary product; and, (h) allowing the product to cool while maintaining the pressure at a predetermined level until the product reaches a predetermined temperature at which point the press is opened and the product is removed from the press.

DETAILED DESCRIPTION OF THE PREFERRED EMBODIMENTS

The present invention provides non-porous unitary solid surface products and methods for manufacturing the same. By the term "unitary," it is meant that the products are physically an undivided single piece, and therefore they are not a laminate structure consisting of separate layers that can be separated or delaminated. It should be understood that some products of the invention might visually appear (to the unaided human eye) to be a laminate of separate layers which maintain their integrity, but this visual appearance is not correct. The layers of polymeric starting material have in fact melted together and have become an undivided single piece. From the standpoint of aesthetically-pleasing visual appearance, line drawings and words are not capable of describing the strikingly beautiful and unusual visual effects provided by the solid surface products of the invention. The inventive solid surface products may be employed to make countertops, sinks, lavatories, desktops, table tops, chairs, windowsill, and the like.

Figure 1:
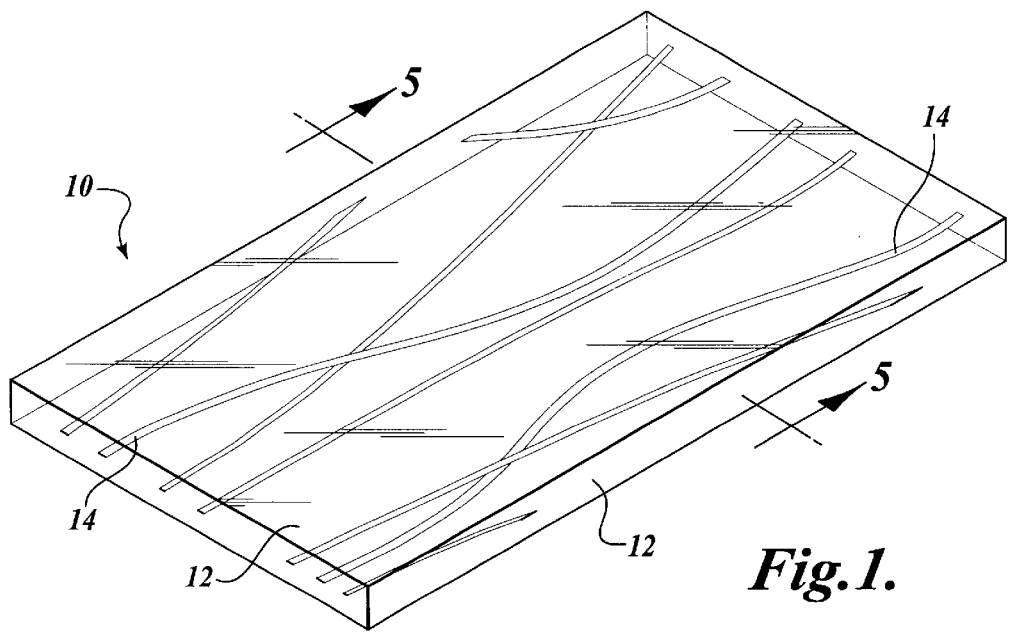
FIG. 1 is a pictorial or three-dimensional view of one embodiment of the invention illustrating a unitary solid surface product having a matrix made of polymethylmethacrylate, polyvinyl chloride, polycarbonate, or combinations thereof, and decorative objects that are permanently fixated in the matrix. In this example, the fixated objects consist of dried long-stem grass.

The first embodiment of the invention, illustrated by the product in FIG. 1, is a flat non-porous unitary polymeric solid surface structure 10 comprised of a matrix 12 made of clear polymethylmethacrylate, polyvinyl chloride, polycarbonate, or combinations thereof, and one or more visible decorative objects 14 (that is, objects that are visible to the unaided human eye) that are permanently fixated in the matrix 12. In the example illustrated by FIG. 1, the fixated decorative objects 14 consist of dried long-stem grass. As shown in FIG. 1, the fixated decorative objects 14 appear to float in the transparent matrix 12. The outer surfaces of the solid surface structure may have any desired finish, such matte, semi-gloss, or high gloss. The flat structure 10 may be subjected to conventional thermoforming/shaping processes if a non-flat shape is desired.

Figure 5:
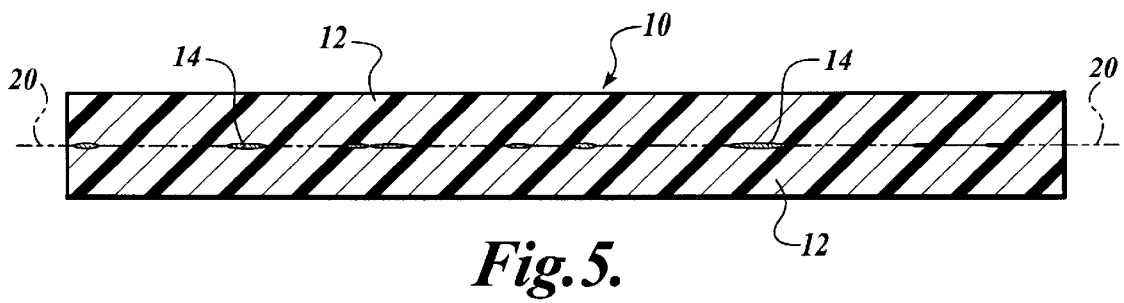
FIG. 5 is a vertical cross-sectional view of the product of FIG. 1 when viewed in the direction of the arrows 5—5 in FIG. 1. The phantom line in FIG. 5 indicates the location where the inner surfaces of two sheets of polymeric material interfaced before they melted together in the manufacturing process.

FIG. 5 is a vertical cross-sectional view of product 10 viewed in the direction of the arrows 5—5 shown in FIG. 1. The phantom line 20 in FIG. 5 indicates the location where the inner surfaces of polymeric sheets 16 and 18 interfaced before they melted together in the manufacturing process (as will be described below).

The Basic Lay-Up Sandwich

Figure 2:
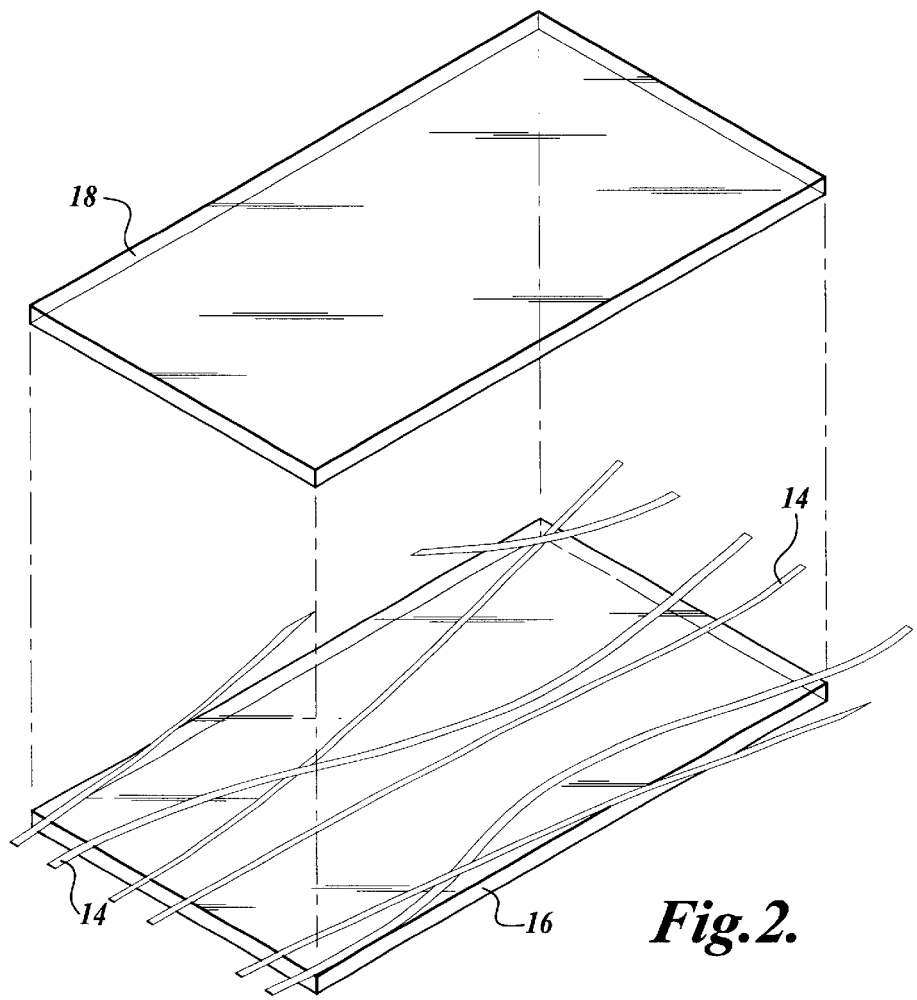
FIG. 2 is an exploded pictorial view illustrating the starting materials employed in making the product shown in FIG. 1. In this example, the starting materials are an upper sheet made of polymethylmethacrylate, polyvinyl chloride, or polycarbonate material, the objects to be fixated consist of dried long-stem grass, and a lower sheet made of polymethylmethacrylate, polyvinyl chloride, or polycarbonate material.
Figure 3:
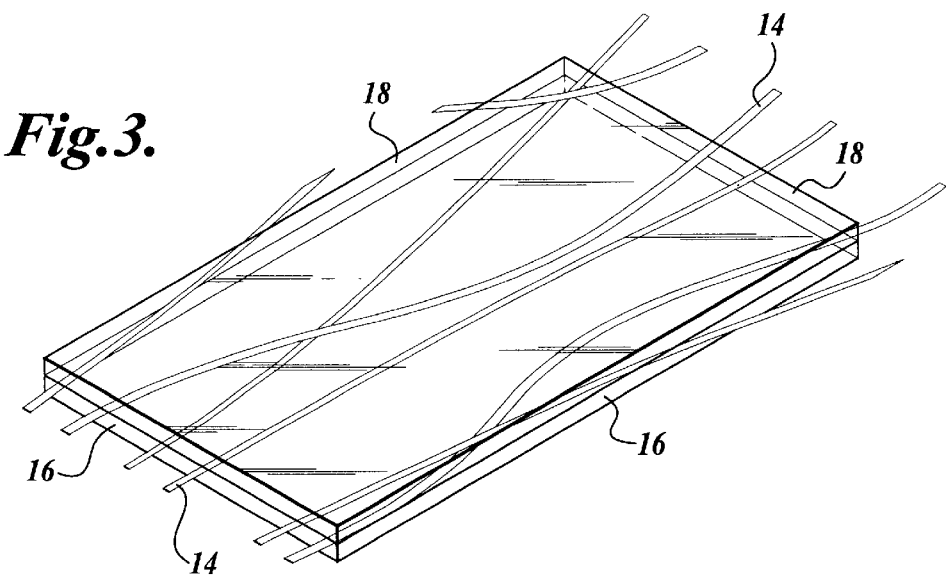
FIG. 3 is a pictorial view illustrating the product shown in FIG. 1 in a finished stage of production before trimming.

The unitary solid surface structures 10 constructed according to the first embodiment of the present invention contain fixated decorative objects 14. The decorative objects 14 can be made of various materials as will be described below. FIG. 2 illustrates how a solid surface structure of this invention is made from a basic lay-up sandwich consisting of the following starting materials: (1) a bottom sheet 16 made of polymethylmethacrylate, polyvinyl chloride, or polycarbonate material; (2) one or more layers of a decorative material 14 (the object to be fixated) which also functions as a breather layer for air and gases to escape during the manufacturing process; and, (3) a top sheet made of polymethylmethacrylate, polyvinyl chloride, or polycarbonate material. As shown in FIG. 2, during lay up the decorative material 14 extends beyond the edges of polymeric sheets 16 and 18. As mentioned above, decorative material 14 provides an escape path for air, water vapor, and gases generated during the pressing operation. Prior to the pressing operation, the decorative material 14 that extends beyond the edges of polymeric sheets 16 and 18 is pulled taunt and taped to a caul plate (as will be described below).

Variations on this basic lay-up sandwich may include more than two layers of polymeric sheet and multiple layers of decorative materials, alternating one and then the other. For example, the basic lay-up sandwich may consist of: (1) a top sheet of polymeric material; (2) a first layer of decorative material; (3) an intermediate sheet of polymeric material; (4) a second layer of a decorative material; and, (5) a bottom sheet of polymeric material.

The thickness of product 10 may range from about 0.030 inch (0.7937 mm) to 2.0 inches (50.80 mm). However, thicker and thinner gauges are possible based on the press capabilities and starting material availability.

Polymethylmethacrylate, Polyvinyl Chloride, and Polycarbonate Starting Materials The non-porous polymeric sheets 16 and 18 may be clear (transparent), colored, textured (on one or both faces), frosted, translucent, opaque, and they may also contain fire-retardant additives and performance additives.

The polymeric sheets 16 and 18 may vary in thickness from about 0.004 inch (0.100 mm) to 1.0 inch (25.4 mm). Also, the polymeric sheets 16 and 18 in the basic lay-up sandwich may vary in thickness from each other.

Polymethylmethacrylate sheet material can be manufactured casting or by extrusion. The preferred polymethylmethacrylate sheet material is made by extrusion and has more consistent gauge. Polymethylmethacrylate sheet material made by casting has inconsistent gauge (hills and valleys) which will cause problems with air and gas entrapment and also gloss/texture problems on the surface of the product caused by pressure variations.

The preferred polymethylmethacrylate sheet material has the following properties:

| Physical Properties | ASTM Test Method | Units | Value |
| --- | --- | --- | --- |
| Specific Gravity | D-792 | | 1.19 |
| Optical Refractive Index | D-542 | | 1.49 |
| Light Transmittance Index (sample thickness 0.100 inch) | D-1003 | % | 92 |
| Total Haze | | % | 2 |
| Sound Transmission (0.125 inch Thickness) | E90-70 E 413 | | 27 |
| Water Absorption | D-570 | % by weight | 0.4 |
| Shrinkage | D-702 | % shrinkage | <5% |

| Mechanical Properties | ASTM Test Method | Units | Value |
| --- | --- | --- | --- |
| Tensile Strength, Maximum | D-638 | psi | 10,100 |
| Tensile Elongation, Maximum | | % | 5.1 |
| Modulus of Elasticity | | psi | 431,000 |
| Flexural Strength, Maximum | D-790 | psi | 14,600 |
| Izod Molded Notch ½ inch × 2½ inch × ¼ inch bar at 73° F. | D-256-56 | Ft lbs/inch of notch | 0.4 |
| Izod Milled Notch ½ inch × 2½ inch × ¼ inch bar at 73° F. | | Ft lbs/inch of notch | 0.28 |
| Tensile Impact Strength | D-1822 | Ft lbs/in$^2$ | 20 |

-continued

| Mechanical Properties | ASTM Test Method | Units | Value |
| --- | --- | --- | --- |
| Abrasion Resistance | D-1044 | | |
| 0 cycles | | Haze % | 2 |
| 10 cycles | | Haze % | 15 |
| 50 cycles | | Haze % | 30 |
| 200 cycles | | Haze % | 50 |
| Rockwell Hardness (sample thickness 0.25 inch) | D-785 | | M-93 |

| Thermal Properties | ASTM Test Method | Units | Value |
| --- | --- | --- | --- |
| Maximum Recommended Continuous Service Temperature | | ° F. | 170–190 |
| Softening Temperature | | ° F. | 210–220 |
| Melting Temperature | | ° F. | 300–315 |
| Deflection Temperature Load, Unannealed | D-648 | | |
| 3.6° F./minute, 264 psi | | ° F. | 190 |
| 3.6° F./minute, 66 psi | | ° F. | 205 |
| Coefficient of Thermal Expansion | D-696 | Ins/in/° F. × 10° | |
| −40° F. | | | 2.7 |
| −20° F. | | | 2.9 |
| 0° F. | | | 3.1 |
| 20° F. | | | 3.2 |
| 40° F. | | | 3.4 |
| 60° F. | | | 3.6 |
| 80° F. | | | 3.9 |
| 100° F. | | | 4.3 |
| Thermal Conductivity | C-177 | BTU (Hr) (Ft$^2$) (° F./in) | 0.9 |
| Flammability (Burning Rate) | D-635 | Ins/minute | |
| | | 0.060 inch | 1.019 |
| | | 0.236 inch | 0.318 |
| Smoke Density Rating | D-2843-77 | % | |
| | | 0.236 inch | 0.36 |
| Self-Ignition Temp | D-1929 | ° F. | |
| | | 0.236 inch | 833 |
| Flame Spread Index/ Smoke Developed Index | E-84-86 | 0.375 inch | 110 |
| | | 0.236 inch | 115 |

| Chemical Properties | ASTM Test Method | Units | Value |
| --- | --- | --- | --- |
| Resistance to Stress- Critical Crazing stress to: | ARTC modification of MIL-P-6997 | | |
| Isopropyl Alcohol | | psi | 900 |
| Lacquer Thinner | | psi | 500 |
| Toluene | | psi | 1,300 |
| Solvesso 100 | | psi | 1,600 |

The preferred polyvinyl chloride sheet material has the following properties and is sold under the trademark INTEDUR TYPE II by World-Pak Corporation/Inteplast Corporation, Livingston, N.J.:

| Properties | Test Method | Units | Value |
|---|---|---|---|
| PHYSICAL | | | |
| Thickness | ASTM D1505 | in. | 1/16 inch~1/2 inch |
| Density | ASTM D792 | g/cm³ | 1.33~1.41 |
| MECHANICAL | | | |
| Tensile Strength @ Yield | ASTM D638 | psi | 6,000~8,000 |
| Elongation @ Break | ASTM D638 | % | 30~70 |
| Flexural Modulus | ASTM D790 | psi | 300,000~400,000 |
| Flexural Strength @ Yield | ASTM D790 | psi | 6,000~10,000 |
| Izod Impact Strength (Notched) | ASTM D256 | ft-lbs./in. | 5~17 |
| Shore Hardness (D scale) | ASTM D2240 | D | 73~81 |
| THERMAL | | | |
| Heat Deflection Temperature | ASTM D648 | ° F. | 145–155 |
| Vertical Burn Test | UL 94 | — | V—O |

The preferred polycarbonate sheet material has the following properties and is sold under the trademark LEXAN 9600 by General Electric Company, Pittsfield, Mass.:

| Property | Test Method | Units | Value |
|---|---|---|---|
| PHYSICAL | | | |
| Specific Gravity | ASTM D792 | — | 1.25 |
| Water Absorption, Equilibrium, 24 Hrs | ASTM D570 | % | 0.20 |
| Light Transmission (avg.), 0.125 inch thickness | ASTM D1003 | % | 85 |
| MECHANICAL | | | |
| Tensile Strength | ASTM D638 | psi | |
| @ Yield | | | 9,500 |
| Ultimate | | | 9,000 |
| Elongation | ASTM D638 | % | 95 |
| Tensile Modulus | ASTM D638 | psi | 235,000 |
| Flexural Strength | ASTM D790 | psi | 13,500 |
| Flexural Modulus | ASTM D790 | psi | 370,000 |
| Compressive Strength | ASTM D695 | psi | 12,500 |
| Dynatup Impact Strength, 1/2 inch dia. dart, (gauge dependant), E 73° F. | ASTM D3783 | ft-lbs | 50 |
| Gardner Impact Strength, round tup (gauge dependant), @ 73° F. | ASTM D3029 | in-lbs. | >320 |
| Izod Impact Strength (gauge dependant) | ASTM D256A | ft-lbs./in. | |
| Notched @ 73° F. | | | 2.4 |
| Unnotched @ 73° F. | | | NB |
| THERMAL | | | |
| Coefficient of Thermal Expansion | ASTM D696 | in./in./° F. | $3.75 \times 10^{-5}$ |
| Heat Deflection Temperature @ 264 psi | ASTM D648 | ° F. | 280 |
| FLAMMABILITY | | | |
| UL Flammability | UL 94 | — | V-0 (90 mils and above) V-2 (34–89 mils) |
| FAA Flammability @ 40 to 125 mils | FAR 25.853 | — | Passes A & B |
| ATS 1000 @ 40 to 125 mils | — | — | Pass |

Materials for Decorative Object to be Fixated

The material 14 to be fixated in the polymeric matrix 12 may be made of textile fabric, paper, plastic film, plastic sheet, metallic wire, rod, mesh, bar, wood veneer, and various dried natural materials (such as the long-stem grass illustrated in FIG. 1), tree bark, plant leaves, petals, and twigs). It is important that the material be dry to avoid giving off water vapor or steam during the manufacturing process.

The material 14 may be one or more layers of a textile fabric made of various fibers. Textile fabrics can impart beautiful and unusual visual effects to the product, such as an iridescent effect or a moiré effect. Non-limiting examples of suitable textile fabrics are: synthetic, semi-synthetic, naturally occurring and polymeric, including for example, rayon, polyester, nylon, synthetic polyamides (such as nylon 66 and nylon 6), acrylic, modacrylic, cellulose acetate, cotton, wool, silk and fiberglass. The fabric may be woven, knitted, spun-bonded, or prepared by other well-known processes in the textile trade. The fabric may be printed, coated, dyed, sublimated or decorated by other techniques known within the textile trade. Fabrics with loose weaves and have as open area of 0.005 inch or greater between yarns/threads are best. Fabrics with rough and porous surfaces are also preferred over smooth surfaces. Tightly woven fabrics with smooth surfaces will not function in the thermal melting process because they prevent resin transfer through the material. Natural fibers are preferred due to their porosity. The melted resin saturates such fibers more readily. The textile fabric may vary in thickness from about 0.00045 inch (0.0114 mm) to 0.25 inch (6.35 mm).

As mentioned above, the material 14 to be fixated in the matrix 12 may also be made of wood veneer, paper, dried plant fibers and parts. Non-limiting examples are: cellulose, cotton, linen, pulp, rag, dried plant materials and fibers including long-stem grass, leaves, petals, bark and twigs from reed, bamboo, papyrus, banana, mulberry, and wicker. For these types of material, the thickness of the layer may be from about 0.00045 inch (0.0114 mm) to 0.25 inch (6.35 mm).

The material 14 to be fixated in the polymeric matrix 12 may also be made of dry metal. Non-limiting examples are: copper, bronze, brass, steel, stainless steel, iron, nickel, and aluminum. Variety of shapes including: rod, mesh, sheet, perforated sheet, foil, strips, shavings, woven, and cable. The metal may be decorated such as etched, anodized, sanded, brushed, stained, painted, printed, chemically treated, galvanized, corroded, aged, polished, and plated. For these types of material, the thickness of the layer may be from about 0.00045 inch (0.0114 mm) to 1.0 inch (25.4 mm).

The material 14 to be fixated in the matrix 12 may also be a plastic sheet or film. Non-limiting examples are: polymethylmethacrylate, polycarbonate, polyvinyl chloride, PETG copolyester, polyethylene, polypropylene, polyester, polyvinylidinefluoride (PVDF) (sold under the trademark KYNAR), polyvinylfluoride (PVF) (sold under the trademark TEDLAR), and polyurethane. For these types of material, the thickness of the layer may be from about 0.00045 inch (0.0114 mm) to 1.0 inch (25.4 mm).

Manufacturing Processes

The invention also includes methods for manufacturing the unitary solid surface structure 10. These manufacturing methods do not involve using a mold and casting a liquid resin around the object to be fixated.

In order to produce products 10 which are free of defects (such as air or gas bubbles entrapped in the matrix, voids in the matrix, or cracks in the matrix), it has been found to be critical to process the above-described basic lay-up sandwich according to the following operating parameters. These process parameters work well with most paper and fabric decorative materials.

First, the basic lay-up sandwich must be processed in a heated press that can apply the required heat and pressure to melt the polymeric sheets 16 and 18 together and thereby create the matrix 12 that fixates the one or more decorative objects 14 within the matrix. Most preferred is a steam heated multiple opening press.

Second, when using the preferred polymeric sheets described above, the press should be preheated to a temperature of about 280° F. Then the lay-up sandwich is loaded into the press. The press is then closed against the lay-up sandwich at a pressure of about 40 pounds per square inch (psi). The press temperature is then ramped up until the lay-up sandwich reaches a temperature of about 290° F.–310° F. while maintaining the pressure at about 40 psi. This temperature works well for polymethylmethacrylate and polyvinyl chloride. Polycarbonate requires a higher temperature of about 350° F.–375° F.

Third, at this point the press must be opened and all pressure is removed from the lay-up sandwich. This step is referred to as "bumping" the press. This step is critical in order to allow the heated air, water vapor, and gases to escape from between the polymeric sheets 16 and 18 in the lay-up sandwich so that bubbles or voids are not entrapped in the matrix 12.

Fourth, the press is then closed against the lay-up sandwich and the pressure is ramped up to about 160 psi. The press temperature is then ramped up until the materials in the lay-up sandwich reach about 290° F.–310° F. while maintaining the pressure at about 160 psi. Again, this temperature works well for polymethylmethacrylate and polyvinyl chloride, but polycarbonate requires a higher temperature of 350° F.–375° F. This pressure and temperature is then held for about 1 to 6 minutes depending on the thickness of the lay-up sandwich to allow the polymeric sheets 16 and 18 to melt together in the lay-up sandwich.

Fifth, the heat is turned off and the product is allowed to gradually cool while maintaining the pressure at about 160 psi until the product reaches a temperature of about 100° F. at which point the press is opened and the product (which needs some trimming) is removed from the press. If needed, a coolant may be circulated through the platens to cool the press. This step of gradually cooling the product is important because the product is being annealed, thereby removing the internal strains resulting from the previous operations. This prevents the polymeric matrix 12 from developing cracks, warping, or excessive shrinking.

Prior to full-scale production, the compatibility between specific decorative materials and the polymeric sheets should be evaluated. Some decorative materials can degrade under heat and pressure resulting in discoloration, color bleed, and separation.

During the pressing process, the outer surface of the polymeric sheets can optionally be deeply embossed or also textured using coated release papers or release films. A variety of suitable textured release papers are available from the S. D. Warren Company, Westbrook, Me. A variety of release films are available from the DuPont Company, Wilmington, Del. The release papers and release films have specific textures and gloss levels that are transferred onto the polymeric sheets during the pressing/heating operation. The release papers and release films also separate the polymeric sheets from the caul plate (described in Example 1 below) and thereby they prevent the polymeric sheets from sticking to the caul plate.

Refinishing

One of the advantages of the solid surface structures of the invention is that if they become scratched or marred, they are capable of being restored and refinished. The is particularly important for applications such as table tops and countertops. Refinishing may be accomplished for matte, semi-gloss, and high gloss finishes. The preferred process for refinishing uses an orbital disc sanding machine and film abrasives sold under the trademark TRIZACT and disc sanding pads sold under the trademark HOOKIT II, both products of Minnesota Mining and Manufacturing Co., St. Paul, Minn. The process involves sanding out the defects in the surface and then polishing.

Optional Features

During the pressing/heating operation, specialty films can also be applied one or both of the polymeric sheets to enhance the abrasion resistance, chemical resistance, and ultraviolet resistance of the final product. These specialty films may be made of various materials including polyester, polyvinylfluoride (PVF), ethylene trifluoroethylene (ETFE), fluorinated ethylenepropylene (FEP), polyvinylidenefluoride (PVDF), and chlorotrifluoroethylene (CTFE).

These specialty films can be on the top and/or bottom of the final product. Typically, these films have a higher melt point than polymethylmethacrylate and therefore require the use of a heat-activated adhesive coating, which is applied to the film prior to the pressing/heating operation. Generally, the specialty film has a thickness of 0.004 inch (0.100 mm) to 0.020 inch (0.500 mm).

EXAMPLE 1

In this example, the basic lay-up sandwich consists of three layers of the following starting materials: (1) a bottom sheet of the preferred polymethylmethacrylate material that is 0.060 inch thick, 48 inches wide, and 96 inches long; (2) a decorative textile fabric that is 58 inches wide and 102 inches long; and (3) a top sheet of the preferred polymethylmethacrylate that is 0.060 inch thick, 48 inches wide, and 96 inches long.

The final lay-up book is made as follows. A textured sheet of release paper that is 60 inches wide and 100 inches long is placed on a 0.060 inch thick aluminum caul plate and taped to the caul plate. The basic lay-up sandwich (described in the paragraph above) is placed on top of the textured sheet of release paper. The textured sheet of release paper will impart an aesthetically-pleasing texture to the outer surface of the bottom sheet of polymethylmethacrylate. The decorative textile fabric extending beyond the edges of polymethylmethacrylate sheets is pulled taunt and taped to the caul plate. Another sheet of textured release paper that is 60 inches wide and 100 inches long is placed on top of the basic lay-up sandwich. This textured sheet of release paper will impart an aesthetically-pleasing texture to the outer surface of the top sheet of polymethylmethacrylate. Another caul plate is placed on top of the upper sheet of textured release paper and the upper textured sheet of release paper is taped to the caul plate. Thermocouples are attached to the lay-up sandwich so that the temperature of the sandwich can be accurately measured.

Four plies of canvas are placed below the bottom caul plate and above the top caul plate to evenly distribute the pressure and heat during the pressing/heating operation. The book is placed on a 0.125 inch thick aluminum sheet loader pan to facilitate loading and unloading of the book into the press.

The press is preheated to a temperature of about 280° F. Then the final lay-up book is loaded into the press. The press is closed against the book at a pressure of about 40 psi. The press temperature is then ramped up until the lay-up sandwich reaches a temperature of about 290° F.–310° F. while maintaining the pressure at about 40 psi. The press is opened and all pressure is removed from the book. The press is closed against the book and the pressure is ramped up to about 160 psi. The press temperature is ramped up until the materials in the lay-up sandwich reach a temperature of about 290° F. 310° F. while maintaining the pressure at about 160 psi. This pressure and temperature is then held for about 1 to 6 minutes depending on the thickness of the lay-up sandwich to allow the polymethylmethacrylate sheets to melt together in the lay-up sandwich to provide a unitary product.

The heat is then turned off and the product is allowed to gradually cool while maintaining the pressure at about 160 psi until the product reaches a temperature of about 100° F. at which point the press is opened and the product (which may need some trimming) is removed from the press.

Example 1 can also be performed using polyvinyl chloride or polycarbonate, but polycarbonate requires the higher temperature of 350° F.–375° F. Example 1 can also be performed using a combination of polymethylmethacrylate, polyvinyl chloride, or polycarbonate. There are benefits in combining the properties of two thermoplastics. For example, by combining polyvinyl chloride and polymethylmethacrylate, the polyvinyl chloride will improve the flammability and chemical resistance of the polymethylmethacrylate, and the polymethylmethacrylate will improve the clarity, ultra-violet resistance, and abrasion resistance of the polyvinyl chloride. The thermoplastics need to be formulated to have similar processing temperatures to work in the press process.

EXAMPLE 2

In this example, the thickness of the product is 0.25 inch or greater. When fabricating products in a thickness of 0.25 inch or greater employing delicate decorative papers, fabrics, or organic materials, a first stage is necessary to encapsulate the decorative material within two thin sheets of 0.060 inch polymethylmethacrylate to prevent tearing of the decorative material caused by movement of the polymethylmethacrylate during pressing. The thinner sheets of polymethylmethacrylate will hold the decorative material in place with minimal movement during stage two. The two-stage process enables products to be made in thicker gauges with less "melt out." Thus, maximum thickness is preserved. The goal is to transfer heat to the lay-up sandwich to melt the polymethylmethacrylate sheets together using the least amount of heat, pressure, and time.

In stage 1, a 0.12 inch intermediate product with 0.005 inch relief texture is made encapsulating the delicate decorative material. First, an intermediate lay-up book is made consisting of the following sequence from top to bottom: (1) four plies of canvas padding; caul plate; (2) textured release paper or plate providing 0.005 inch relief; (3) 0.060 inch clear polymethylmethacrylate sheet (size 48 inches by 96 inches); (4) a layer of the delicate decorative material; (5) 0.060 inch clear polymethylmethacrylate sheet (size 48 inches by 96 inches); (6) textured release paper or plate providing 0.005 inch relief; (7) caul plate; and, (8) four plies of canvas padding.

The press is heated to about 280° F., the intermediate lay-up book is placed in the press, and the press is closed. The pressure is brought to 40 psi. When the materials in the lay-up reach 290° F., the pressure is increased to 160 psi and held for 1 minute. The intermediate product is then gradually cooled to 100° F.

In stage 2, the final lay-up book is made consisting of the following sequence from top to bottom: four plies of canvas padding; caul plate; textured release paper or plate; 0.060 inch clear polymethylmethacrylate sheet (size 48 inches by 96 inches); 0.12 inch textured intermediate product (from stage 1) encapsulating the delicate decorative material delicate decorative material; 0.060 inch clear polymethylmethacrylate sheet (size 48 inches by 96 inches); textured release paper or plate; caul plate; and, four plies of canvas padding.

The press is preheated to a temperature of about 280° F. Then the final lay-up book is loaded into the press. The press is closed against the book at a pressure of about 40 psi. The press temperature is then ramped up until the lay-up sandwich reaches a temperature of about 290° F.–310° F. while maintaining the pressure at about 40 psi. The press is opened and all pressure is removed from the book. The press is closed against the book and the pressure is ramped up to about 160 psi. The press temperature is ramped up until the materials in the lay-up sandwich reach a temperature of about 290° F.–310° F. while maintaining the pressure at about 160 psi. This pressure and temperature is then held for about 1 to 6 minutes depending on the thickness of the lay-up sandwich to allow the polymethylmethacrylate sheets to melt together in the lay-up sandwich to provide a unitary product.

The heat is then turned off and the product is allowed to gradually cool while maintaining the pressure at about 160 psi until the product reaches a temperature of about 100° F. at which point the press is opened and the product (which may need some trimming) is removed from the press.

Example 2 can also be performed using polyvinyl chloride and polycarbonate, but polycarbonate requires the higher temperature of about 350° F.–375° F. Example 2 can also be performed using a combination of polymethylmethacrylate, polyvinyl chloride, or polycarbonate.

EXAMPLE 3

Figure 4:
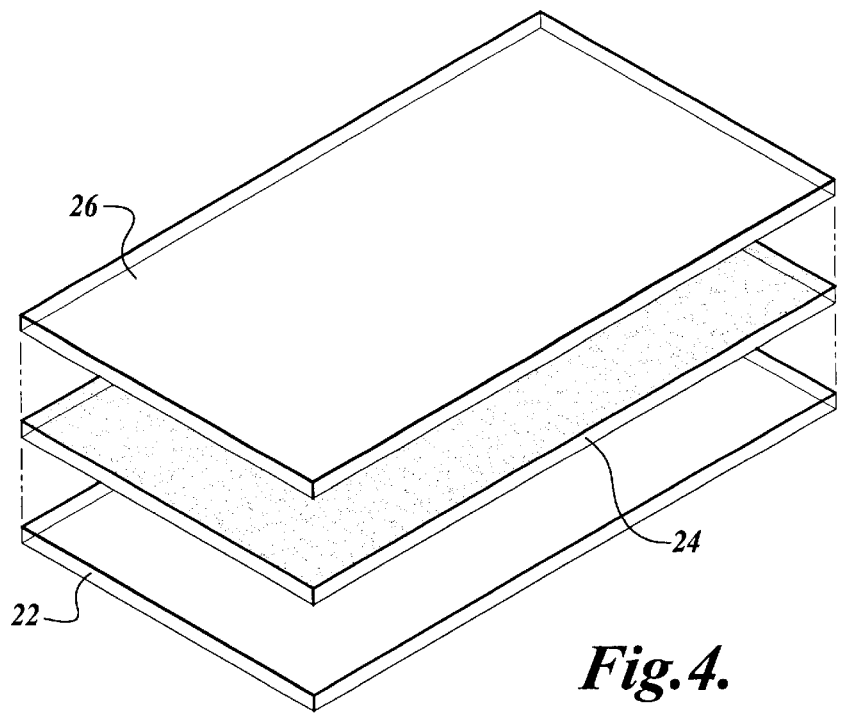
FIG. 4 is an exploded pictorial view illustrating the starting materials employed in making a second embodiment of the invention. In this example, the starting materials are an upper sheet of polymethylmethacrylate, polyvinyl chloride, or polycarbonate material, an intermediate sheet of polymethylmethacrylate, polyvinyl chloride, or polycarbonate material that has been textured on both surfaces, and a lower sheet of polymethylmethacrylate, polyvinyl chloride, or polycarbonate material.

This is an example of the second embodiment of the invention illustrated by FIG. 4. In this example, the basic lay-up sandwich consists of three layers of the following starting materials: (1) a bottom sheet 22 of the preferred polymethylmethacrylate material that is 0.060 inch thick, 48 inches wide, and 96 inches long; (2) a pre-textured intermediate sheet 24 of the preferred polymethylmethacrylate material that is 0.060 inch thick, 48 inches wide, and 96 inches long; and, (3) a top sheet 26 of the preferred polymethylmethacrylate that is 0.060 inch thick, 48 inches wide, and 96 inches long. When making this product (which does not have a layer of decorative material), it is necessary to pre-texture both surfaces of the intermediate polymethylmethacrylate sheet 24 to allow air and gases to escape during the pressing/heating operation. If the surfaces of the polymethylmethacrylate sheet 24 is not pre-textured, air bubbles will be trapped within the product.

In stage 1, an intermediate lay-up book is made consisting of the following sequence from top to bottom: (1) four plies of canvas padding; caul plate; (2) textured release paper or plate providing 0.005 inch relief; (3) 0.060 inch clear or colored polymethylmethacrylate sheet (size 48 inches by 96 inches); (4) textured release paper or plate providing 0.005 inch relief; caul plate; and, (5) four plies of canvas padding.

The press is heated to about 280° F., the intermediate lay-up book is placed in the press, and the press is closed. The pressure is brought to 40 psi. When the lay-up reaches about 290° F., the pressure is increased to 160 psi and held for 1 minute. The intermediate product is then gradually cooled to 100° F.

In stage 2, the final lay-up book is made consisting of the following sequence from top to bottom: (1) four plies of canvas padding; (2) caul plate; (3) textured release paper or plate; (4) 0.060 inch clear polymethylmethacrylate sheet (size 48 inches by 96 inches); (5) 0.060 inch textured intermediate product (from stage 1); (6) 0.060 inch clear polymethylmethacrylate sheet (size 48 inches by 96 inches); (7) textured release paper or plate; (8) caul plate; and, (9) four plies of canvas padding.

The press is preheated to a temperature of about 280° F. Then the final lay-up book is loaded into the press. The press is closed against the book at a pressure of about 40 psi. The press temperature is then ramped up until the lay-up sandwich reaches a temperature of about 290° F.–310° F. while maintaining the pressure at about 40 psi. The press is opened and all pressure is removed from the book. The press is closed against the book and the pressure is ramped up to about 160 psi. The press temperature is ramped up until the materials in the lay-up sandwich reach a temperature of about 290° F.–310° F. while maintaining the pressure at about 160 psi. This pressure and temperature is then held for about 1 to 6 minutes depending on the thickness of the lay-up sandwich to allow the polymethylmethacrylate sheets to melt together in the lay-up sandwich to provide a unitary product.

The heat is then turned off and the product is allowed to gradually cool while maintaining the pressure at about 160 psi until the product reaches a temperature of about 100° F. at which point the press is opened and the product is removed from the press. The product has a stratum of the textured material permanently fixated in the matrix and co-extensive with the edges of the matrix. The flat product may be subjected to conventional thermoforming/shaping processes if a non-flat shape is desired.

This Example 3 can also be performed using polyvinyl chloride and polycarbonate, but polycarbonate requires the higher temperature of about 350° F.–375° F. Example 3 can also be performed using a combination of polymethylmethacrylate, polyvinyl chloride, or polycarbonate.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method for manufacturing a flat non-porous unitary solid surface structure comprising the steps of:
    (a) providing a first flat non-porous unitary sheet made of a polymeric material selected from the group consisting of polymethylmethacrylate, polyvinyl chloride, and polycarbonate;
    (b) placing a decorative object on said first sheet of polymeric material wherein the decorative object extends beyond at least one edge of said first sheet of polymeric material;
    (c) placing a second flat non-porous unitary sheet of a polymeric material selected from the group consisting of polymethylmethacrylate, polyvinyl chloride, and polycarbonate on top of said decorative object wherein the decorative object also extends beyond at least the corresponding edge of said second sheet of polymeric material, whereby a lay-up sandwich is formed comprised of said first flat sheet of polymeric material, said decorative object which extends beyond at least one edge of both of said sheets of polymeric material, and said second flat sheet of polymeric material;
    (d) loading the lay-up sandwich into a press;
    (e) applying a predetermined amount of heat and pressure to said lay-up sandwich for a predetermined period of time;
    (f) opening the press and removing all pressure from the lay-up sandwich to allow air and gases to escape from the lay-up sandwich;
    (g) closing the press and applying a predetermined amount of heat and pressure to said lay-up sandwich for a predetermined period of time whereby said first and second polymeric material sheets melt together in the lay-up sandwich to provide a unitary product; and,
    (h) allowing the product to cool while maintaining the pressure at a predetermined level until the product reaches a predetermined temperature at which point the press is opened and the product is removed from the press.

2. The method of claim 1 wherein the decorative object in step (b) is made of a dry material selected from the group consisting of textile fabric, paper, plastic film, plastic sheet, metallic wire, rod, mesh, bar, wood veneer, dried natural materials, tree bark, plant leaves, petals, and twigs.

3. A method for manufacturing a flat non-porous unitary solid surface structure comprising the steps of:
    (a) providing a first flat non-porous unitary sheet of polymethylmethacrylate;
    (b) placing a decorative object on said sheet of polymethylmethacrylate wherein the decorative object extends beyond at least one edge of said first sheet of polymethylmethacrylate;
    (c) placing a second flat non-porous unitary sheet of polymethylmethacrylate on top of said decorative object wherein the decorative object extends beyond at least one corresponding edge of said second sheet of polymethylmethacrylate, whereby a lay-up sandwich is formed comprised of said first sheet of polymethylmethacrylate, said decorative object which extends beyond at least one edge of said first sheet of polymethylmethacrylate, and said second sheet of polymethylmethacrylate wherein the decorative object extends beyond at least one corresponding edge of said second sheet of polymethylmethacrylate;
    (d) loading the lay-up sandwich into a press;
    (e) applying a predetermined amount of heat and pressure to said lay-up sandwich;
    (f) opening the press and removing all pressure from the lay-up sandwich to allow air and gases to escape from the lay-up sandwich;
    (g) closing the press and applying a predetermined amount of heat and pressure to said lay-up sandwich for a predetermined period of time whereby said first and second polymethylmethacrylate sheets melt together in the lay-up sandwich to provide a unitary product; and,
    (h) allowing the product to cool while maintaining the pressure at a predetermined level until the product reaches a predetermined temperature at which point the press is opened and the product is removed from the press.

4. The method of claim 3 wherein the decorative object in step (b) is made of a dry material selected from the group consisting of textile fabric, paper, plastic film, plastic sheet, metallic wire, rod, mesh, bar, wood veneer, dried natural materials, tree bark, plant leaves, petals, and twigs.

5. A method for manufacturing a flat non-porous unitary solid surface structure comprising the steps of:
   (a) providing a first flat non-porous unitary sheet of polymethylmethacrylate;
   (b) placing a decorative object on said sheet of polymethylmethacrylate wherein the decorative object extends beyond at least one edge of said first sheet of polymethylmethacrylate;
   (c) placing a second flat non-porous unitary sheet of polymethylmethacrylate on top of said decorative object wherein the decorative object extends beyond at least one corresponding edge of said second sheet of polymethylmethacrylate, whereby a lay-up sandwich is formed comprised of said first sheet of polymethylmethacrylate, said decorative object which extends beyond at least one edge of said first sheet of polymethylmethacrylate, and said second sheet of polymethylmethacrylate wherein the decorative object extends beyond at least one corresponding edge of said second sheet of polymethylmethacrylate;
   (d) loading the lay-up sandwich into a press;
   (e) heating the lay-up sandwich to about 290°–310° F. while applying a pressure of about 40 psi;
   (f) opening the press and removing all pressure from the lay-up sandwich to allow air and gases to escape from the lay-up sandwich;
   (g) closing the press and heating the lay-up sandwich to about 290°–310° F. while applying a pressure of about 160 psi for a predetermined period of time whereby said first and second polymethylmethacrylate sheets melt together in the lay-up sandwich to provide a unitary product; and,
   (h) allowing the product to cool while maintaining the pressure at a predetermined level until the product reaches a predetermined temperature at which point the press is opened and the product is removed from the press.

6. The method of claim 5 wherein the decorative object in step (b) is made of a dry material selected from the group consisting of textile fabric, paper, plastic film, plastic sheet, metallic wire, rod, mesh, bar, wood veneer, dried natural materials, tree bark, plant leaves, petals, and twigs.

7. A method for manufacturing a flat non-porous unitary solid surface structure comprising the steps of:
   (a) providing a first flat non-porous unitary sheet of polyvinyl chloride;
   (b) placing a decorative object on said sheet of polyvinyl chloride wherein the decorative object extends beyond at least one edge of said first sheet of polyvinyl chloride;
   (c) placing a second flat non-porous unitary sheet of polyvinyl chloride on top of said decorative object wherein the decorative object extends beyond at least one corresponding edge of said second sheet of polyvinyl chloride, whereby a lay-up sandwich is formed comprised of said first sheet of polyvinyl chloride, said decorative object which extends beyond at least one edge of said first sheet of polyvinyl chloride, and said second sheet of polyvinyl chloride wherein the decorative object extends beyond at least one corresponding edge of said second sheet of polyvinyl chloride;
   (d) loading the lay-up sandwich into a press;
   (e) applying a predetermined amount of heat and pressure to said lay-up sandwich;
   (f) opening the press and removing all pressure from the lay-up sandwich to allow air and gases to escape from the lay-up sandwich;
   (g) closing the press and applying a predetermined amount of heat and pressure to said lay-up sandwich for a predetermined period of time whereby said first and second polyvinyl chloride sheets melt together in the lay-up sandwich to provide a unitary product; and,
   (h) allowing the product to cool while maintaining the pressure at a predetermined level until the product reaches a predetermined temperature at which point the press is opened and the product is removed from the press.

8. The method of claim 7 wherein the decorative object in step (b) is made of a dry material selected from the group consisting of textile fabric, paper, plastic film, plastic sheet, metallic wire, rod, mesh, bar, wood veneer, dried natural materials, tree bark, plant leaves, petals, and twigs.

9. A method for manufacturing a flat non-porous unitary solid surface structure comprising the steps of:
   (a) providing a first flat non-porous unitary sheet of polyvinyl chloride;
   (b) placing a decorative object on said sheet of polyvinyl chloride wherein the decorative object extends beyond at least one edge of said first sheet of polyvinyl chloride;
   (c) placing a second flat non-porous unitary sheet of polyvinyl chloride on top of said decorative object wherein the decorative object extends beyond at least one corresponding edge of said second sheet of polyvinyl chloride, whereby a lay-up sandwich is formed comprised of said first sheet of polyvinyl chloride, said decorative object which extends beyond at least one edge of said first sheet of polyvinyl chloride, and said second sheet of polyvinyl chloride wherein the decorative object extends beyond at least one corresponding edge of said second sheet of polyvinyl chloride;
   (d) loading the lay-up sandwich into a press;
   (e) heating the lay-up sandwich to about 290° F.–310° F. while applying a pressure of about 40 psi;
   (f) opening the press and removing all pressure from the lay-up sandwich to allow air and gases to escape from the lay-up sandwich;
   (g) closing the press and heating the lay-up sandwich to about 290° F.–310° F. while applying a pressure of about 160 psi for a predetermined period of time whereby said first and second polyvinyl chloride sheets melt together in the lay-up sandwich to provide a unitary product; and,
   (h) allowing the product to cool while maintaining the pressure at a predetermined level until the product reaches a predetermined temperature at which point the press is opened and the product is removed from the press.

10. The method of claim 9 wherein the decorative object in step (b) is made of a dry material selected from the group consisting of textile fabric, paper, plastic film, plastic sheet, metallic wire, rod, mesh, bar, wood veneer, dried natural materials, tree bark, plant leaves, petals, and twigs.

11. A method for manufacturing a flat non-porous unitary solid surface structure comprising the steps of:
   (a) providing a first flat non-porous unitary sheet of polycarbonate;

(b) placing a decorative object on said sheet of polycarbonate wherein the decorative object extends beyond at least one edge of said first sheet of polycarbonate;

(c) placing a second flat non-porous unitary sheet of polycarbonate on top of said decorative object wherein the decorative object extends beyond at least one corresponding edge of said second sheet of polycarbonate, whereby a lay-up sandwich is formed comprised of said first sheet of polycarbonate, said decorative object which extends beyond at least one edge of said first sheet of polycarbonate, and said second sheet of polycarbonate wherein the decorative object extends beyond at least one corresponding edge of said second sheet of polycarbonate;

(d) loading the lay-up sandwich into a press;

(e) heating the lay-up sandwich to about 350° F.–375° F. while applying a pressure of about 40 psi;

(f) opening the press and removing all pressure from the lay-up sandwich to allow air and gases to escape from the lay-up sandwich;

(g) closing the press and heating the lay-up sandwich to about 350° F.–375° F. while applying a pressure of about 160 psi for a predetermined period of time whereby said first and second polycarbonate sheets melt together in the lay-up sandwich to provide a unitary product; and, (h) allowing the product to cool while maintaining the pressure at a predetermined level until the product reaches a predetermined temperature at which point the press is opened and the product is removed from the press.

12. The method of claim 11 wherein the decorative object in step (b) is made of a dry material selected from the group consisting of textile fabric, paper, plastic film, plastic sheet, metallic wire, rod, mesh, bar, wood veneer, dried natural materials, tree bark, plant leaves, petals, and twigs.

13. A method for manufacturing a flat non-porous unitary solid surface structure comprising the steps of:

(a) providing a first flat non-porous unitary sheet of polycarbonate;

(b) placing a decorative object on said sheet of polycarbonate wherein the decorative object extends beyond at least one edge of said first sheet of polycarbonate;

(c) placing a second flat non-porous unitary sheet of polycarbonate on top of said decorative object wherein the decorative object extends beyond at least one corresponding edge of said second sheet of polycarbonate, whereby a lay-up sandwich is formed comprised of said first sheet of polycarbonate, said decorative object which extends beyond at least one edge of said first sheet of polycarbonate, and said second sheet of polycarbonate wherein the decorative object extends beyond at least one corresponding edge of said second sheet of polycarbonate;

(d) loading the lay-up sandwich into a press;

(e) applying a predetermined amount of heat and pressure to said lay-up sandwich;

(f) opening the press and removing all pressure from the lay-up sandwich to allow air and gases to escape from the lay-up sandwich;

(g) closing the press and applying a predetermined amount of heat and pressure to said lay-up sandwich for a predetermined period of time whereby said first and second polycarbonate sheets melt together in the lay-up sandwich; and, (h) allowing the product to cool while maintaining the pressure at a predetermined level until the product reaches a predetermined temperature at which point the press is opened and the product is removed from the press.

14. The method of claim 13 wherein the decorative object in step (b) is made of a dry material selected from the group consisting of textile fabric, paper, plastic film, plastic sheet, metallic wire, rod, mesh, bar, wood veneer, dried natural materials, tree bark, plant leaves, petals, and twigs.

15. A method for manufacturing a flat non-porous unitary solid surface structure comprising the steps of:

(a) providing a first flat non-porous unitary sheet made of a polymeric material selected from the group consisting of polymethylmethacrylate, polyvinyl chloride, and polycarbonate;

(b) placing a flat layer of textured material made of a material selected from the group consisting of polymethylmethacrylate, polyvinyl chloride, and polycarbonate, on said first sheet of polymeric material, wherein the layer of textured material is co-extensive with the edges of said first sheet of polymeric material;

(c) placing a second flat non-porous unitary sheet of a polymeric material selected from the group consisting of polymethylmethacrylate, polyvinyl chloride, and polycarbonate on top of said layer of textured material wherein the second sheet of polymeric material is co-extensive with the edges of said layer of textured material, whereby a lay-up sandwich is formed comprised of said first flat sheet of polymeric material, said flat layer of textured material, and said second flat sheet of polymeric material;

(d) loading the lay-up sandwich into a press;

(e) applying a predetermined amount of heat and pressure to said lay-up sandwich;

(f) opening the press and removing all pressure from the lay-up sandwich to allow air and gases to escape from the lay-up sandwich;

(g) closing the press and applying a predetermined amount of heat and pressure to said lay-up sandwich for a predetermined period of time whereby said first polymeric material sheet, said layer of textured material, and said second flat sheet of polymeric material melt together in the lay-up sandwich to provide a unitary product; and, (h) allowing the product to gradually cool while maintaining the pressure at a predetermined level until the product reaches a predetermined temperature at which point the press is opened and the product is removed from the press.

16. A method for manufacturing a flat non-porous unitary solid surface structure comprising the steps of:

(a) providing a first flat non-porous unitary sheet of polymethylmethacrylate;

(b) placing a flat layer of textured polymethylmethacrylate on said first polymethylmethacrylate sheet, wherein the layer of textured polymethylmethacrylate is co-extensive with the edges of said first sheet of polymethylmethacrylate;

(c) placing a second flat non-porous unitary sheet of polymethylmethacrylate on top of said layer of textured polymethylmethacrylate wherein the second sheet of polymethylmethacrylate is co-extensive with the edges of said layer of textured polymethylmethacrylate, whereby a lay-up sandwich is formed comprised of said first flat sheet of polymethylmethacrylate, said flat layer of textured polymethylmethacrylate, and said second flat sheet of polymethylmethacrylate;

(d) loading the lay-up sandwich into a press;

(e) applying a predetermined amount of heat and pressure to said lay-up sandwich;

(f) opening the press and removing all pressure from the lay-up sandwich to allow air and gases to escape from the lay-up sandwich;

(g) closing the press and applying a predetermined amount of heat and pressure to said lay-up sandwich for a predetermined period of time whereby said first polymeric material sheet, said layer of textured material, and said second flat sheet of polymeric material melt together in the lay-up sandwich to provide a unitary product; and, (h) allowing the product to cool while maintaining the pressure at a predetermined level until the product reaches a predetermined temperature at which point the press is opened and the product is removed from the press.

17. A method for manufacturing a flat non-porous unitary solid surface structure comprising the steps of:

(a) providing a first flat non-porous unitary sheet of polymethylmethacrylate;

(b) placing a flat layer of textured polymethylmethacrylate on said first polymethylmethacrylate sheet, wherein the layer of textured polymethylmethacrylate is co-extensive with the edges of said first sheet of polymethylmethacrylate;

(c) placing a second flat non-porous unitary sheet of polymethylmethacrylate on top of said layer of textured polymethylmethacrylate wherein the second sheet of polymethylmethacrylate is co-extensive with the edges of said layer of textured polymethylmethacrylate, whereby a lay-up sandwich is formed comprised of said first flat sheet of polymethylmethacrylate material, said flat layer of textured polymethylmethacrylate, and said second flat sheet of polymethylmethacrylate;

(d) loading the lay-up sandwich into a press;

(e) heating the lay-up sandwich to about 290° F.–310° F. while applying a pressure of about 40 psi;

(f) opening the press and removing all pressure from the lay-up sandwich to allow air and gases to escape from the lay-up sandwich;

(g) closing the press and heating the lay-up sandwich to about 290° F.–310° F. while applying a pressure of about 160 psi for a predetermined period of time whereby said first flat sheet of polymethylmethacrylate material, said flat layer of textured polymethylmethacrylate, and said second flat sheet of polymethylmethacrylate melt together in the lay-up sandwich to provide a unitary structure; and, (h) allowing the product to cool while maintaining the pressure at a predetermined level until the product reaches a predetermined temperature at which point the press is opened and the product is removed from the press.

18. A method for manufacturing a flat non-porous unitary solid surface structure comprising the steps of:

(a) providing a first flat non-porous unitary sheet of polyvinyl chloride;

(b) placing a flat layer of textured polyvinyl chloride on said first polyvinyl chloride sheet, wherein the layer of textured polyvinyl chloride is co-extensive with the edges of said first sheet of polyvinyl chloride;

(c) placing a second flat non-porous unitary sheet of polyvinyl chloride on top of said layer of textured polyvinyl chloride wherein the second sheet of polyvinyl chloride is co-extensive with the edges of said layer of textured polyvinyl chloride, whereby a lay-up sandwich is formed comprised of said first flat sheet of polyvinyl chloride material, said flat layer of textured polyvinyl chloride, and said second flat sheet of polyvinyl chloride;

(d) loading the lay-up sandwich into a press;

(e) heating the lay-up sandwich to about 290° F.–310° F. while applying a pressure of about 40 psi;

(f) opening the press and removing all pressure from the lay-up sandwich to allow air and gases to escape from the lay-up sandwich;

(g) closing the press and heating the lay-up sandwich to about 290° F.–310° F. while applying a pressure of about 160 psi for a predetermined period of time whereby said first flat sheet of polyvinyl chloride, said flat layer of textured polyvinyl chloride, and said second flat sheet of polyvinyl chloride melt together in the lay-up sandwich to provide a unitary product; and, (h) allowing the product to cool while maintaining the pressure at a predetermined level until the product reaches a predetermined temperature at which point the press is opened and the product is removed from the press.

19. A method for manufacturing a flat non-porous unitary solid surface structure comprising the steps of:

(a) providing a first flat non-porous unitary polycarbonate;

(b) placing a flat layer of textured polycarbonate on said first polycarbonate sheet, wherein the layer of textured polycarbonate is co-extensive with the edges of said first sheet of polycarbonate;

(c) placing a second flat non-porous unitary sheet of polycarbonate on top of said layer of textured polycarbonate wherein the second sheet of polycarbonate is co-extensive with the edges of said layer of textured polycarbonate, whereby a lay-up sandwich is formed comprised of said first flat sheet of polycarbonate material, said flat layer of textured polycarbonate, and said second flat sheet of polycarbonate;

(d) loading the lay-up sandwich into a press;

(e) applying a predetermined amount of heat and pressure to said lay-up sandwich;

(f) opening the press and removing all pressure from the lay-up sandwich to allow air and gases to escape from the lay-up sandwich;

(g) closing the press and applying a predetermined amount of heat and pressure to said lay-up sandwich for a predetermined period of time whereby said first polymeric material sheet, said layer of textured material, and said second flat sheet of polymeric material melt together in the lay-up sandwich to provide a unitary product; and, (h) allowing the product to cool while maintaining the pressure at a predetermined level until the product reaches a predetermined temperature at which point the press is opened and the product is removed from the press.

20. A method for manufacturing a flat non-porous unitary solid surface structure comprising the steps of:

(a) providing a first flat non-porous unitary sheet of polycarbonate;

(b) placing a flat layer of textured polycarbonate on said first polycarbonate sheet, wherein the layer of textured polycarbonate is co-extensive with the edges of said first polycarbonate sheet;

(c) placing a second flat non-porous unitary sheet of polycarbonate on top of said layer of textured polycarbonate wherein the second sheet of polycarbonate is co-extensive with the edges of said layer of textured polycarbonate, whereby a lay-up sandwich is formed comprised of said first flat sheet of polycarbonate, said flat layer of textured polycarbonate, and said second flat sheet of polycarbonate;

(d) loading the lay-up sandwich into a press;

(e) heating the lay-up sandwich to about 350° F.–375° F. while applying a pressure of about 40 psi;

(f) opening the press and removing all pressure from the lay-up sandwich to allow air and gases to escape from the lay-up sandwich;

(g) closing the press and heating the lay-up sandwich to about 350° F.–375° F. while applying a pressure of about 160 psi for a predetermined period of time whereby said first flat sheet of polycarbonate, said flat layer of textured polycarbonate, and said second flat sheet of polycarbonate melt together in the lay-up sandwich to provide a unitary product; and, (h) allowing the product to cool while maintaining the pressure at a predetermined level until the product reaches a predetermined temperature at which point the press is opened and the product is removed from the press.

* * * * *